(12) United States Patent
Isono

(10) Patent No.: US 9,605,720 B2
(45) Date of Patent: Mar. 28, 2017

(54) FRICTION BRAKE DEVICE

(75) Inventor: Hiroshi Isono, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 67 days.

(21) Appl. No.: 14/390,640

(22) PCT Filed: Apr. 7, 2012

(86) PCT No.: PCT/JP2012/059610
§ 371 (c)(1),
(2), (4) Date: Oct. 3, 2014

(87) PCT Pub. No.: WO2013/150658
PCT Pub. Date: Oct. 10, 2013

(65) Prior Publication Data
US 2015/0096856 A1 Apr. 9, 2015

(51) Int. Cl.
*F16D 63/00* (2006.01)
*F16D 55/40* (2006.01)
(Continued)

(52) U.S. Cl.
CPC ........... *F16D 63/004* (2013.01); *F16D 51/62* (2013.01); *F16D 55/14* (2013.01); *F16D 55/40* (2013.01);
(Continued)

(58) Field of Classification Search
CPC ........ F16D 63/004; F16D 55/14; F16D 55/40; F16D 51/62; F16D 2055/0054; F16D 2055/0087; F16D 2055/0058
See application file for complete search history.

(56) References Cited

U.S. PATENT DOCUMENTS 3,285,372 A * 11/1966 Rossmann .............. F16D 55/46
188/72.2
5,796,192 A 8/1998 Riepl
(Continued)

FOREIGN PATENT DOCUMENTS

JP 62-126630 * 8/1987
JP 8 121509 5/1996
(Continued)

OTHER PUBLICATIONS

International Search Report Issued May 29, 2012 in PCT/JP12/059610 Filed Apr. 7, 2012.
(Continued)

*Primary Examiner* — Xuan Lan Nguyen
(74) *Attorney, Agent, or Firm* — Oblon, McClelland, Maier & Neustadt, L.L.P.

(57) ABSTRACT

A friction brake device has a brake rotor that rotates around an axis of rotation, brake pads that can rotate around an axis of autorotation parallel to the axis of rotation, support members that support the brake pads respectively, and pressing devices that press the brake pads against the brake rotor respectively. In the friction brake device, when the brake pads are pressed against the brake rotor, the brake pads revolve around the axis of rotation relatively to the brake rotor while being frictionally engaged with lateral faces of the brake rotor respectively. The support members press the brake pads in a direction perpendicular to the axis of rotation, and frictionally engage outer peripheries of the brake pads with a cylindrical face of the brake rotor respectively. The brake pads auto-rotate around the axis of autorotation upon beginning to be pressed, but come to rest when the pressing force increases.

7 Claims, 10 Drawing Sheets

(51) Int. Cl.
*F16D 51/62* (2006.01)
*F16D 55/14* (2006.01)
*F16D 55/00* (2006.01)

(52) U.S. Cl.
CPC ............... *F16D 2055/0054* (2013.01); *F16D 2055/0058* (2013.01); *F16D 2055/0087* (2013.01)

(56) References Cited

U.S. PATENT DOCUMENTS

| | | | |
|---|---|---|---|
| 5,911,292 | A | 6/1999 | Schade et al. |
| 6,491,138 | B1 * | 12/2002 | Spagele ............. F16D 55/14 188/70 B |
| 2012/0234121 | A1 | 9/2012 | Jensen et al. |
| 2014/0166428 | A1 | 6/2014 | Van Druten et al. |
| 2015/0060215 | A1 | 3/2015 | Isono |
| 2015/0075921 | A1 | 3/2015 | Isono |
| 2015/0096856 | A1 | 4/2015 | Isono |
| 2015/0107942 | A1 | 4/2015 | Isono |
| 2015/0114767 | A1 | 4/2015 | Isono |
| 2015/0114768 | A1 | 4/2015 | Doleschel et al. |
| 2015/0129382 | A1 | 5/2015 | Isono |

FOREIGN PATENT DOCUMENTS

| | | |
|---|---|---|
| JP | 2008 151199 | 7/2008 |
| WO | WO 97/25547 A1 | 7/1997 |
| WO | WO 2013/157644 A1 | 10/2013 |
| WO | WO 2013/157645 A1 | 10/2013 |
| WO | WO 2013/157646 A1 | 10/2013 |

OTHER PUBLICATIONS

U.S. Office Action mailed Dec. 21, 2015 in co-pending U.S. Appl. No. 14/391,084.
Notice of Allowance dated Aug. 16, 2016, in co-pending U.S. Appl. No. 14/391,084, filed Oct. 7, 2014.
U.S. Notice of Allowance mailed Apr. 27, 2016 in co-pending U.S. Appl. No. 14/391,084.
Corrected Notice of Allowability in related U.S. Appl. No. 14/391,084, issued Oct. 21, 2016.
Corrected Notice of Allowance/Allowability dated Nov. 28, 2016 in U.S. Appl. No. 14/391,084, filed Oct. 7, 2014.

* cited by examiner

FRICTION BRAKE DEVICE

TECHNICAL FIELD

The invention relates to a friction brake device, and more particularly, to a friction brake device that generates a frictional force by pressing a friction member against a brake rotor.

BACKGROUND ART

As one friction brake device, there is known a brake device in which respective friction members are pressed against two regions of a brake rotor, as described in, for example, Patent Document 1 mentioned below, which was filed by the present applicant. In particular, in a brake device described in Patent Document 1 mentioned below, respective friction members are pressed against a lateral face of a disc portion of a brake rotor, and are pressed against a cylindrical face on an outer periphery of the brake rotor.

In this kind of brake device, a braking torque is generated also through frictional engagement of a friction member with a cylindrical face on an outer periphery of a brake rotor. In consequence, a higher braking torque can be generated than in a brake device having a friction member that is pressed only against a lateral face of a brake rotor.

RELATED ART DOCUMENT

Patent Document

Patent Document 1: Japanese Patent Application Publication No. 8-121509 (JP-8-121509 A)

SUMMARY OF THE INVENTION

Problem to be Solved by the Invention

In the friction brake device described in the aforementioned laid-open publication, the friction member is rockably supported around a rocking axis that extends parallel to an axis of rotation of the brake rotor between the axis of rotation and the cylindrical face on the outer periphery of the brake rotor. Then, the friction member is rocked around the rocking axis by a frictional force between the friction member and the lateral face of the brake rotor. Thus, the friction member is pressed against the cylindrical face on the outer periphery of the brake rotor, and is frictionally engaged therewith.

Therefore, when abrasion progresses through frictional engagement of the friction member with the cylindrical face of the brake rotor, that region of the friction member which is frictionally engaged with the cylindrical face of the brake rotor gradually changes, and as a result, the friction coefficient may change. Besides, as the frictionally engaged region changes, the distance between the rocking axis and the frictionally engaged region changes, and the pressing force with which the friction member is pressed against the cylindrical face of the brake rotor changes. Accordingly, in the friction brake device described in the aforementioned laid-open publication, the braking torque may change with the passage of time as a result of changes in the friction coefficient and the pressing force.

It is a main object of the invention to reduce the possibility of changes in the braking torque with the passage of time as a result of changes in a friction coefficient and a pressing force, and stably generate a braking force over a long period, in a friction brake device having a friction member that is pressed against a lateral face of a brake rotor and a cylindrical face on an outer periphery of the brake rotor.

Means for Solving the Problem and Effect of the Invention

According to the invention, there is provided a friction brake device. The friction brake device has a brake rotor that rotates around an axis of rotation, a rotary friction member that can rotate around an axis of autorotation parallel to the axis of rotation, a support member that supports the rotary friction member rotatably around the axis of autorotation, and a pressing device that presses the rotary friction member against the brake rotor. The friction brake device is characterized in that the rotary friction member revolves around the axis of rotation relatively to the brake rotor while being frictionally engaged with a lateral face of the brake rotor, when the pressing device presses the rotary friction member against the brake rotor, that the support member is configured to press the rotary friction member in a direction perpendicular to the axis of rotation, and frictionally engage an outer periphery of the rotary friction member with a cylindrical face of the brake rotor, when the rotary friction member revolves, and that the rotary friction member is caused to auto-rotate around the axis of autorotation by a frictional force between the rotary friction member and the lateral face of the brake rotor when the pressing device begins to press the rotary friction member, but comes to rest when a pressing force by the pressing device increases.

According to this configuration, every time the pressing device begins to press the rotary friction member, the rotary friction member is caused to auto-rotate around the axis of autorotation. Therefore, every time braking is started, the rotary friction member is frictionally engaged, in a different region on an outer periphery thereof, with the cylindrical face of the brake rotor, so the outer periphery of the rotary friction member is homogeneously abraded. Besides, the rotary friction member is always pressed in the direction perpendicular to the axis of rotation by the support member, without rocking as is the case with the friction brake device described in the aforementioned laid-open publication. Accordingly, it is possible to reduce the possibility of changes in the friction coefficient and the pressing force between the outer periphery of the rotary friction member and the cylindrical face of the brake rotor, and stably generate a braking force over a long period, in comparison with the case of the friction brake device described in the aforementioned laid-open publication.

Incidentally, according to this configuration, when the pressing force by the pressing device increases, the rotary friction member comes to rest. Therefore, the outer periphery of the rotary friction member can be reliably frictionally engaged with the cylindrical face of the brake rotor. In consequence, a braking force can be generated through this frictional engagement as well. A higher braking torque can be generated than in a brake device having a friction member that is pressed only against a lateral face of a brake rotor as is the case with the friction brake device described in the aforementioned laid-open publication.

In the aforementioned configuration, the support member may support the rotary friction member rotatably around the axis of autorotation, on a support face including an inclined face that is inclined with respect to a direction perpendicular to a radial direction of the brake rotor, and the support member may press the rotary friction member by a reactive force of a pressing force applied to the inclined face by the rotary friction member.

According to this configuration, when the rotary friction member is frictionally engaged with the lateral face of the brake rotor and is moved in a circumferential direction of the brake rotor relatively to the support member, the rotary friction member presses the inclined face. In consequence, it is possible to press the rotary friction member against the cylindrical face of the brake rotor in the direction perpendicular to the axis of rotation by the reactive force of the pressing force applied to the inclined face by the rotary friction member.

Besides, in the aforementioned configuration, a frictional force between the rotary friction member and the support member may be smaller than a frictional force between an outer periphery of the rotary friction member and the cylindrical face of the brake rotor.

According to this configuration, when the pressing device begins to press the rotary friction member, the rotary friction member can be reliably caused to auto-rotate around the axis of autorotation. Besides, a rotary moment can be imparted to the rotary friction member due to a difference between the frictional force between the rotary friction member and the support member and the frictional force between the outer periphery of the rotary friction member and the cylindrical face of the brake rotor. Therefore, the rotary friction member can be urged to auto-rotate.

In the aforementioned configuration, the support face may be a cylindrical surface of a rolling member that rolls around a rolling axis parallel to the axis of autorotation.

According to this configuration, the support face can rotate around the rolling axis parallel to the axis of autorotation. Therefore, the friction drag between the rotary friction member and the support face of the support member can be reduced in comparison with a case where the rotary friction member and the support face of the support member slide with respect to each other. In consequence, the rotary friction member can be more favorably caused to auto-rotate when the pressing device begins to press the rotary friction member.

In the aforementioned configuration, the support member may include an elastic member that is elastically deformed by the rotary friction member to increase a reactive force applied to the rotary friction member when the rotary friction member revolves.

According to this configuration, the reactive force for the rotary friction member increases. Therefore, it is possible to enhance the pressing force applied to the cylindrical face of the brake rotor by the rotary friction member, and enhance the frictional force between the cylindrical face of the brake rotor and an outer peripheral face of the rotary friction member.

In the aforementioned configuration, the support member may be configured such that an angle of inclination of the inclined face with respect to the direction perpendicular to the radial direction of the brake rotor decreases as the pressing force applied to the inclined face by the rotary friction member increases.

According to this configuration, the angle of inclination of the inclined face decreases, so the component in the direction perpendicular to the axis of rotation as a component of the reactive force of the pressing force with which the inclined face is pressed by the rotary friction member increases. As the pressing force applied to the inclined face by the rotary friction member increases, the pressing force applied to the cylindrical face of the brake rotor by the rotary friction member increases. Therefore, as the pressing force by the pressing device increases, the frictional force between the cylindrical face of the brake rotor and the outer peripheral face of the rotary friction member can be gradually enhanced.

In the aforementioned configuration, the pressing device may press the rotary friction member against the brake rotor via a non-rotary friction member that is non-rotatably supported around the axis of rotation, and the rotary friction member may be frictionally engaged, on one side thereof, with the brake rotor, and may be frictionally engaged, on the other side thereof, with the non-rotary friction member.

According to this configuration, the rotary friction member is frictionally engaged, on the other side thereof, with the non-rotary friction member, and is thereby urged to come to rest. Therefore, the rotary friction member can be effectively brought to rest in a situation where the pressing force by the pressing device increases. Besides, the rotary friction member is pressed on both the sides thereof. Therefore, the deformation stress applied to the rotary friction member can be reduced in comparison with a case where the rotary fiction member is pressed only on one side thereof.

Besides, in the aforementioned configuration, the rotary friction member may be frictionally engaged, on one side thereof, with the brake rotor, and may be frictionally engaged, on the other side thereof, with the non-rotary friction member. The distance from the axis of autorotation of the rotary friction member to the center of a frictional engagement portion on one lateral face and the distance from the axis of autorotation of the rotary friction member to the center of a frictional engagement portion on the other lateral face may be equal to each other.

MODES FOR CARRYING OUT THE INVENTION

Hereinafter, the invention will be described in detail as to some preferred embodiments thereof, with reference to the accompanying drawings.

First Embodiment

Figure 1:
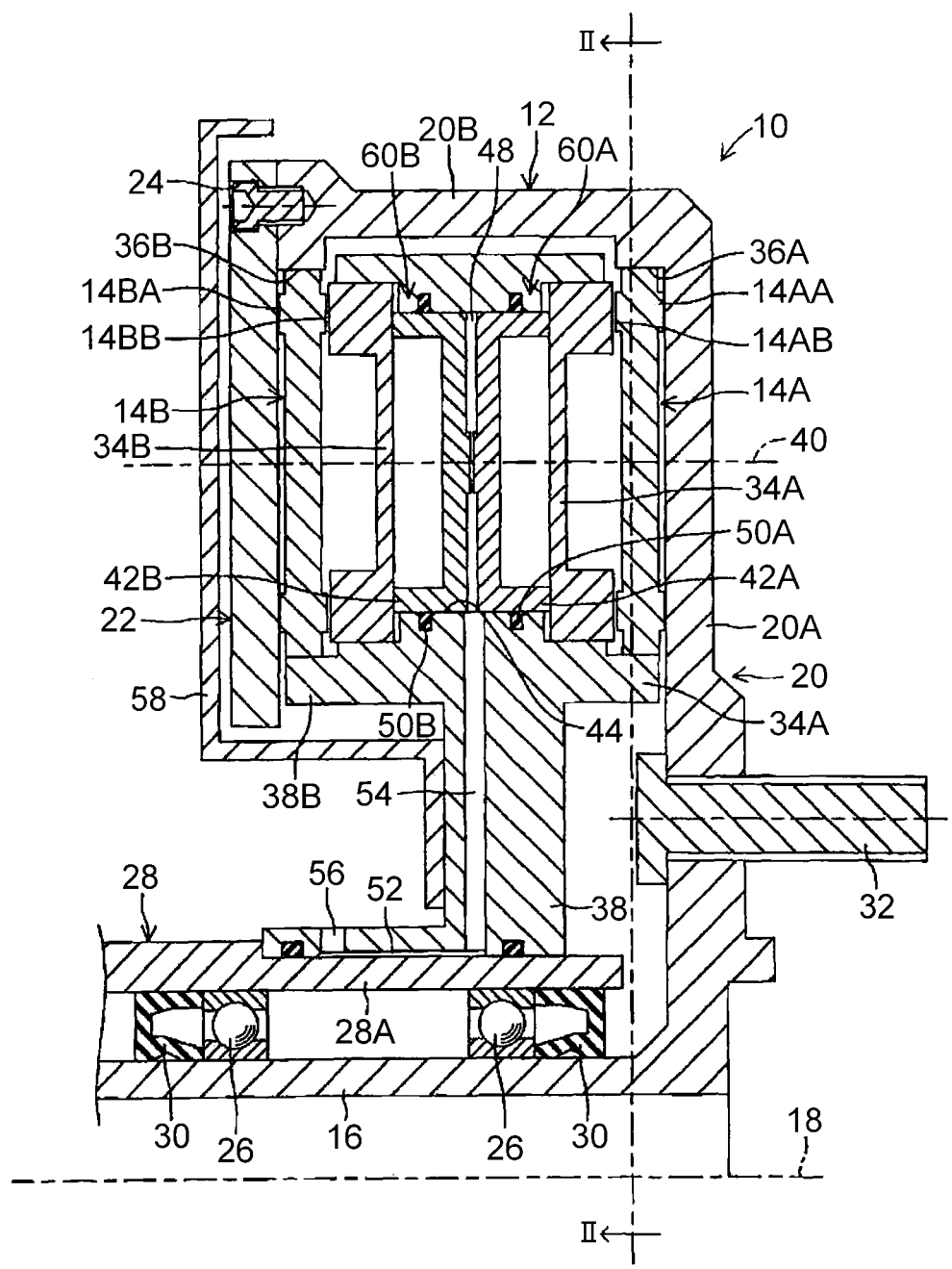
FIG. 1 is a cross-sectional view showing a first embodiment of a friction brake device according to the invention that is configured as a vehicular brake device, as cut along a section passing through an axis of rotation.
Figure 2:
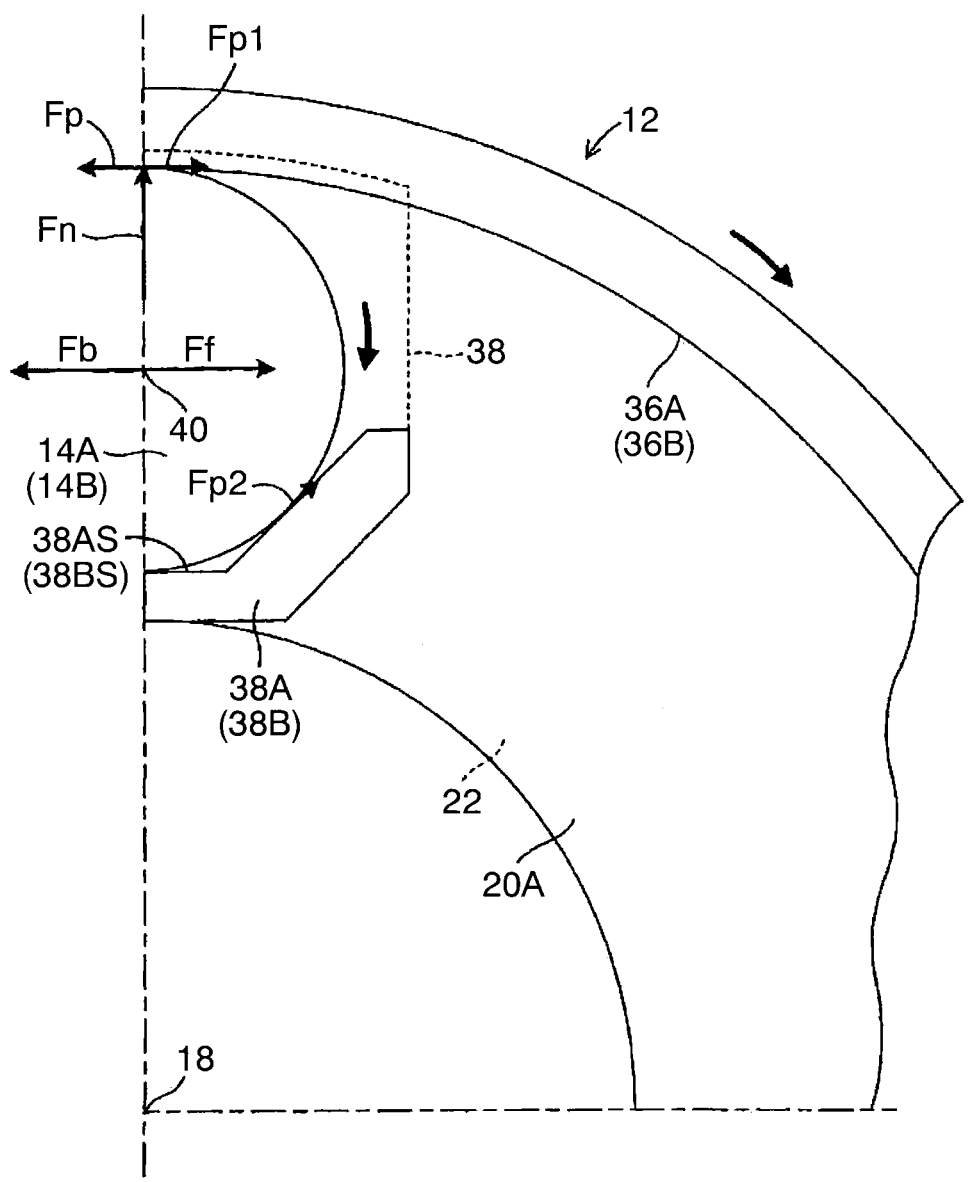
FIG. 2 is a partial cross-sectional view taken along a line II-II of FIG. 1.

FIG. 1 is a cross-sectional view showing the first embodiment of a friction brake device according to the invention that is configured as a vehicular brake device, as cut along a section passing through an axis of rotation. FIG. 2 is a partial cross-sectional view taken along a line II-II of FIG. 1.

In FIG. 1, a brake device as a whole is denoted by 10. The brake device 10 has a brake rotor 12 and brake pads 14A and 14B as rotary friction members. The brake rotor 12 integrally rotates around an axis of rotation 18 together with a rotary shaft 16 of wheels (not shown). Especially in the embodiment of the invention shown in the drawing, the brake rotor 12 has a main rotor 20 that is integrated with the rotary shaft 16, and a subsidiary rotor 22 that rotates integrally with the main rotor. The main rotor 20 and the subsidiary rotor 22 are formed of the same metal material.

The main rotor 20 has a disc portion 20A and a cylinder portion 20B that are spaced apart from each other along the axis of rotation 18. The disc portion 20A is integrally coupled to the rotary shaft 16 at an inner peripheral portion thereof, and extends substantially in the shape of a circular plate around the axis of rotation 18 perpendicularly to the axis of rotation 18. The cylinder portion 20B is integrally connected to an outer periphery portion of the disc portion 20A, and cylindrically extends around the axis of rotation 18. The subsidiary rotor 22 extends in the shape of an annular plate around the axis of rotation 18 perpendicularly to the axis of rotation 18, and is coupled, at an outer periphery portion thereof, to an end portion of the cylinder portion 20B on the other side of the disc portion 20A by a plurality of bolts 24.

Incidentally, the disc portion 20A and the subsidiary rotor 22 are equal in thickness to each other. The thickness of the cylinder portion 20B is smaller than the thickness of the disc portion 20A and the subsidiary rotor 22. However, the cylinder portion 20B cylindrically extends around the axis of rotation 18, and therefore is higher in rigidity than the disc portion 20A and the subsidiary rotor 22.

Thus, the disc portion 20A and the subsidiary rotor 22 function as a first disc portion and a second disc portion that extend around the axis of rotation 18 perpendicularly to the axis of rotation 18 and are spaced apart from each other along the axis of rotation 18, respectively. The cylinder portion 20B functions as a connection portion that cooperates with the bolts 24 to integrally connect the outer peripheral portions of the disc portion 20A and the subsidiary rotor 22 to each other. The disc portion 20A, the cylinder portion 20B, and the subsidiary rotor 22 assume a U-shaped cross-sectional shape that is open radially inward as viewed in a radial cross-section passing through the axis of rotation 18. Opposed faces of the disc portion 20A and the subsidiary rotor 22 define friction faces that extend along the entire circumference around the axis of rotation 18, parallel to each other and perpendicularly to the axis of rotation 18, respectively.

The rotary shaft 16 is rotatably supported around the axis of rotation 18 via a pair of ball bearings 26 by a sleeve portion 28A of a wheel support member 28. Spaces among the pair of ball bearings 26, the rotary shaft 16, and the sleeve portion 28A are filled with a lubricant such as grease. A pair of seal members 30 are arranged on both sides of the pair of ball bearings 26 in the axial direction respectively. The seal members 30 seal the space between the rotary shaft 16 and the sleeve portion 28A in order to prevent powder dust and muddy water from entering the ball bearings 26.

Although not shown in the drawing, the disc portion 20A of the main rotor 20 is integrally coupled to a rim portion of a wheel by four bolts 32, which are spaced apart from one another by 90° around the axis of rotation 18, and nuts screwed to these bolts. Accordingly, the rotary shaft 16 and the brake rotor 12 (the main rotor 20 and the subsidiary rotor 22) rotate around the axis of rotation 18 together with the wheel.

The brake pads 14A and 14B are arranged between the disc portion 20A and the subsidiary rotor 22, and assume the shapes of circular plates that are identical in shape and size to each other. The brake pad 14A has, on both lateral faces of an outer peripheral portion thereof, friction portions 14AA and 14AB. The brake pad 14B has, on both lateral faces of an outer peripheral portion thereof, friction portions 14BA and 14BB. Each of the friction portions, which is bulged from the lateral face of the circular plate portion, extends in the shape of an annular band around the axis of a corresponding one of the brake pads.

Incidentally, the brake pads 14A and 14B are manufactured according to, for example, a power sintering method, so the friction portions may be formed integrally with the circular plate portion. Besides, the friction portions may be formed through the adhesion of annular band-like friction materials to the lateral face of the circular plate portion or the fixation of annular band-like friction materials to the lateral face of the circular plate portion by other means. Furthermore, friction portion 14AA and the like are constituted by the same friction material, but may be constituted by different friction materials.

Cylindrical faces 36A and 36B that are opposed to outer peripheral faces of the brake pads 14A and 14B respectively are provided on inner faces at both ends of the cylinder portion 20B of the main rotor 20 respectively. A stationary member 38 as a non-rotary member is inserted between the brake pads 14A and 14B. The stationary member 38 has, on both lateral faces thereof shelf portions 38A and 38B respectively. The shelf portions 38A and 38B cooperate with the cylindrical faces 36A and 36B respectively, and support the brake pads 14A and 14B respectively, in such a manner as to be displaceable relatively to the stationary member 38 along an axis of autorotation 40 parallel to the axis of rotation 18 and rotatable around the axis of autorotation 40.

As shown in FIG. 2, the shelf portion 38A has a support face 38AS that is constituted of a bottom wall face that extends perpendicularly to the radial direction of the brake device 10, and a pair of lateral wall faces that extend on both sides of the bottom wall face while being inclined with respect to the bottom wall face by 45°. The distance between the bottom wall face of the shelf portion 38A and the cylindrical face 36A in the radial direction of the brake rotor 12 is set slightly greater than the outer diameter of the brake pad 14A. Although not shown in the drawing, the shelf portion 38B also has a support face 38BS similar to that of the shelf portion 38A. The distance between a bottom wall face of the shelf portion 38B and the cylindrical face 36B in the radial direction of the brake rotor 12 is set slightly greater than the outer diameter of the brake pad 14B.

Non-rotary friction members 34A and 34B are disposed between the brake pads 14A and 14B and the stationary member 38 respectively. The non-rotary friction members 34A and 34B have cylinder portions that abut, on end faces thereof, on the friction portions 14AB and 14BB of the brake pads 14A and 14B respectively, and circular plate portions that are formed integrally with end portions of the cylinder portions on the other side of the brake pads respectively. However, the circular plate portions may be dispensed with.

The cylinder portions of the non-rotary friction members 34A and 34B are supported by the stationary member 38, in such a manner as to be displaceable relatively to the stationary member 38 along the axis of autorotation 40 parallel to the axis of rotation 18 but not rotatable around the axis of autorotation 40. Incidentally, the prevention of rotation of the non-rotary friction members may be achieved by a key and a key groove that extend along the axis of autorotation 40, or by flatly forming part of a surface of a shaft portion and part of an inner face of a cylinder portion that are engaged with each other.

Opening ends of pistons 42A and 42B, each of which assumes the shape of a bottomed cylinder, are fixed to lateral faces of the non-rotary friction members 34A and 34B on the circular plate sides by fixation means such as welding or the like. The pistons 42A and 42B are aligned with axes of the brake pads 14A and 14B respectively. The stationary member 38 has a cylinder bore 44 that has a circular cross-section and extends along the axis of autorotation 40 between the non-rotary friction members 34A and 34B. The pistons 42A and 42B are fitted in the cylinder bore 44 in a reciprocable manner along the axis of autorotation 40, and cooperate with each other to define a cylinder chamber 48. O-ring seals 50A and 50B are fitted in ring grooves provided in the cylinder bore 44 respectively. These O-ring seals seal the spaces between the pistons 42A and 42B and the cylinder bore 44 respectively.

Incidentally, although only the single brake pad 14A, only the single brake pad 14B, only the single piston 42A, only the single piston 42B, and only the single cylinder chamber 48 are shown in FIG. 1, a plurality of each of these components may be provided in a state of being uniformly spaced apart from one another around the axis of rotation 18.

The stationary member 38 has, on an inner face of an inner peripheral portion thereof, an annular groove 52 that extends around the axis of rotation 18. The annular groove 52 is connected through communication to the cylinder chamber 48 by an inner passage 54 that extends in the radial direction. The annular groove 52 is connected to a hydraulic brake actuator by a communication hole 56 that is provided through an inner peripheral portion of the stationary member 38 and a duct (not shown). Besides, a cover member 58 is fixed through screw clamp to a lateral face that is located radially outward of the inner peripheral portion of the stationary member 38. The cover member 58 covers the subsidiary rotor while being spaced apart from the subsidiary rotor 22, and prevents powder dust and muddy water from entering the space between the brake rotor 12 and the stationary member 38.

As is apparent from the foregoing description, when the oil pressure in the cylinder chamber 48 is increased, the brake pads 14A and 14B, the non-rotary friction members 34A and 34B, and the pistons 42A and 42B are each driven in such a direction as to move away from each other. Thus, the brake pads 14A and 14B are pressed against the friction faces of the disc portion 20A and the subsidiary rotor 22 respectively. In consequence, the pistons 42A and 42B, the cylinder bore 44 and the like are supported by the stationary member 38, and function as pressing devices 60A and 60B that press the brake pads 14A and 14B against the disc portion 20A and the subsidiary rotor 22 via the non-rotary friction members 34A and 34B respectively.

When the wheel (not shown) rotates, the brake rotor 12 and the rotary shaft 16 rotate around the axis of rotation 18 together with the wheel, but the brake pads 14A and 14B, a sleeve portion 28, the stationary member 38, and the cover member 58 do not rotate. In consequence, the disc portion 20A and the subsidiary rotor 22 rotate around the axis of rotation 18 relatively to the brake pads 14A and 14B respectively. Therefore, the brake pads 14A and 14B revolve around the axis of rotation 18 relatively to the disc portion 20A and the subsidiary rotor 22 respectively.

Accordingly, when pressed against the disc portion 20A and the subsidiary rotor 22 respectively, the brake pads 14A and 14B come into friction contact, at the friction portions 14AA and 14BA, with the friction faces of the disc portion 20A and the subsidiary rotor 22 respectively. Therefore, as shown in FIG. 2, a frictional force Fb in a circumferential direction reverse to a rotational direction of the brake rotor 12 is applied to the brake rotor 12. A frictional force Ff that is reverse in direction to the frictional force Ff is applied to the brake pads 14A and 14B.

With the frictional force Fb, the brake pads 14A and 14B are pressed against the inclined faces of the support faces 38AS of the shelf portions 38A and 38B of the stationary member 38 respectively. The inclined faces are inclined by 45°. Therefore, the brake pads 14A and 14B are pressed radially outward from the inclined faces with a force Fn (=Fb×tan 45°) as a reactive force of the pressing force respectively (a wedge action), and are frictionally engaged, on outer peripheral faces thereof, with the cylindrical faces 36A and 36B of the disc portion 20A respectively.

Besides, the friction portions 14AA and 14BA of the brake pads 14A and 14B are in friction contact with the friction faces of the disc portion 20A and the subsidiary rotor 22 respectively. Due to the generation of a frictional force, the brake pads 14A and 14B are caused to auto-rotate around the axis of autorotation 40.

Figure 3:
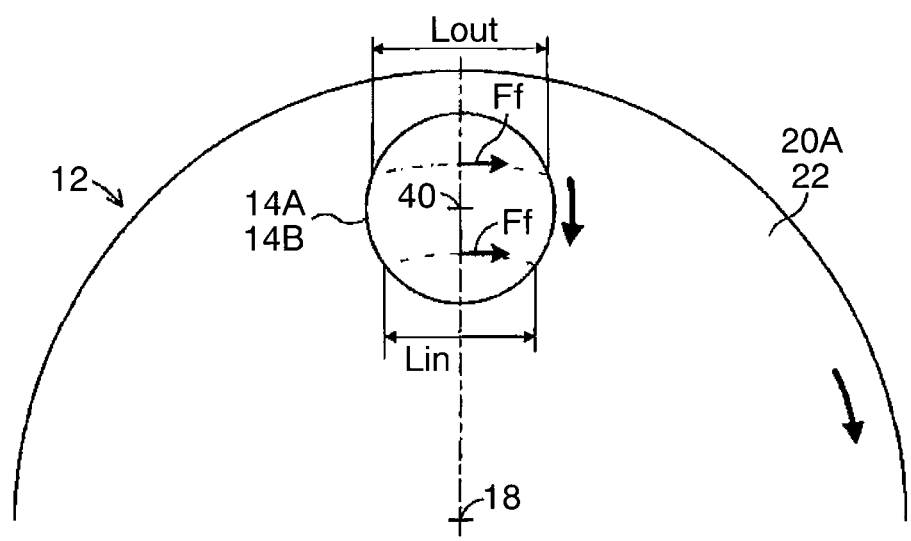
FIG. 3 is a schematic illustrative view of an essential part of the brake device according to the first embodiment of the invention, as viewed along the axis of rotation.

FIG. 3 is a schematic illustrative view of an essential part of the brake device 10 according to the first embodiment of the invention, as viewed along the axis of rotation 18. As described above, the frictional force Ff that is generated through friction contact of the friction portions 14AA and 14BA with the friction faces of the disc portion 20A and the subsidiary rotor 22 respectively is applied in such a manner as to move the brake pads 14A and 14B in the rotational direction of the brake rotor 12. If the friction coefficient and the pressing force between the friction portions 14AA and 14BA on the one hand and the disc portion 20A and the subsidiary rotor 22 on the other hand are identical in all the regions, the frictional force Ff is also identical in all the regions.

However, a length L of application of the frictional force Ff namely, the length around the axis of rotation 18 differs depending on the distance from the axis of rotation 18 in the radial direction. Even if the distance from the axis of autorotation 40 is identical, a distance Lout radially outward of the axis of autorotation 40 is greater than a distance Lin radially inward of the axis of autorotation 40. The energy (workload) imparted to the brake pads 14A and 14B by the frictional force Ff is considered to be the product of the frictional force Ff and the length L. The energy imparted radially outward of the axis of autorotation 40 is greater than the energy imparted radially inward of the axis of autorotation 40. In consequence, due to this difference in energy, the brake pads 14A and 14B auto-rotate by being rotated around the axis of autorotation 40 in the same direction as the rotational direction of the disc portion 20A and the subsidiary rotor 22 around the axis of rotation 18.

A frictional force Fp1 resulting from frictional engagement between the outer peripheral faces of the brake pads 14A and 14B and the cylindrical faces 36A and 36B of the disc portion 20A is applied in such a direction as to urge the brake pads to auto-rotate. However, a frictional force Fp2 between the outer peripheral faces of the brake pads 14A and 14B and support faces 38AS and 38BS is applied in such a direction as to inhibit the brake pads from auto-rotating.

In a situation where at least the pressing force of the first pressing device 60A and the second pressing device 60B is small, the friction coefficients of the respective frictional engagement portions are set such that the frictional force Fp2 becomes smaller than the frictional force Fp1. In consequence, in a situation where at least the pressing force of the first pressing device 60A and the second pressing device 60B is small, the brake pads 14A and 14B are allowed to auto-rotate around the axis of autorotation 40, and are urged to auto-rotate around the axis of autorotation 40 due to the difference between the frictional forces Fp1 and Fp2. Incidentally, the relationship among the aforementioned frictional forces is achieved by setting the friction coefficients of the respective frictional engagement portions such that the products of vertical stresses of the respective frictional engagement portions and the friction coefficients establish the relationship among the aforementioned frictional forces.

However, when the pressing force of the first pressing device 60A and the second pressing device 60B is enhanced, the force with which the brake pads 14A and 14B are pressed against the cylindrical faces 36A and 36B respectively increases, and the frictional force resulting from frictional engagement of the friction portions AB and 14BB of the brake pads 14A and 14B with the non-rotary friction members 34A and 34B increases as well.

However, when the pressing force of the first pressing device 60A and the second pressing device 60B is enhanced, the force with which the brake pads are pressed against the cylindrical faces respectively increases, and the frictional force resulting from frictional engagement of the friction portions AB and 14BB of the brake pads with the non-rotary friction members 34A and 34B increases as well. This frictional force is applied in such a manner as to restrain the brake pads 14A and 14B from auto-rotating. Therefore, when the pressing force of the first pressing device 60A and the second pressing device 60B is enhanced, the brake pads 14A and 14B cease to auto-rotate. That is, the outer peripheral faces of the brake pads 14A and 14B generate only a frictional force resulting from frictional engagement with the cylindrical faces 36A and 36B.

When the brake pads 14A and 14B auto-rotate around the axis of autorotation 40, the friction portions AB and 14BB of the brake pads 14A and 14B are frictionally engaged with the non-rotary friction members 34A and 34B respectively, and a frictional force Fs (not shown) is generated. This frictional force Fs is applied as a force that restrains the brake rotor 12 from rotating via the brake pads 14A and 14B.

Thus, when the pressing devices 60A and 60B begin to press the brake pads 14A and 14B respectively, the brake pads 14A and 14B first auto-rotate instantaneously while revolving. However, after that, the brake pads 14A and 14B only revolve, and generate a frictional force resulting from revolution. The frictional force resulting from revolution includes the frictional force Ff resulting from frictional engagement of the friction portions AA and 14BA of the brake pads with the disc portion 20A and the subsidiary rotor 22, and the frictional force Fp resulting from frictional engagement of the outer peripheral faces of the brake pads with the cylindrical faces 36A and 36B.

Accordingly, the sum of a braking torque Tb resulting from the frictional force Fb and a braking torque Tp resulting from the frictional force Fp is a braking torque Tbp. The braking torques Tb, Tp and Tbp are proportional to the pressing force applied to the brake pads 14A and 14B by the pressing devices 60A and 60B respectively. The pressing force is proportional to the oil pressure in the cylinder chamber 48. Accordingly, the braking torque Tb, namely, the braking force generated by the brake device 10 can be controlled by controlling the pressing force through the control of the oil pressure in the cylinder chamber 48.

As described above, when the pressing by the pressing devices 60A and 60B is started, namely, when braking is started, the brake pads 14A and 14B instantaneously auto-rotate. In consequence, every time braking is started, the brake pads 14A and 14B auto-rotate, although slightly, so the outer peripheral faces of the brake pads 14A and 14B are frictionally engaged with the cylindrical faces 36A and 36B respectively over the entire circumference. In consequence, the change in the friction coefficient or the pressing force resulting from the progress of abrasion can be reduced in comparison with a case where a friction member is frictionally engaged with a cylindrical portion of a brake rotor through pivoting as is the case with the brake device described in the aforementioned laid-open publication. Accordingly, the brake device 10 can be caused to stably generate a braking force over a long period.

Besides, as described above, the braking torque Tbp of the brake device 10 is the sum of the braking torque Tb resulting from the frictional force Fb and the braking torque Tp resulting from the frictional force Fp. In consequence, it is possible to generate a higher braking torque than in a brake device that generates only the braking torque Tb resulting from the frictional force Fb.

For example, although not shown in FIG. 1, the distance between the axis of rotation 18 and rotary torque transmission devices 66A and 66B is set to 152.5 mm, the distance between the axis of rotation 18 and the axis of autorotation 40 is set to 120 mm, and the distance between the axis of autorotation 40 and the rotary torque transmission devices 66A and 66B is set to 25 mm. Besides, the friction coefficient of respective frictional contact portions is denoted by μ (=0.25), and the pressing force of the pressing devices 60A and 60B is denoted by Fkgf.

The frictional force Ff may be considered to be applied to the centers of the brake pads 14A and 14B. Besides, both the brake pads 14A and 14B generate the frictional force Ff, so the braking torque Tb resulting from the frictional force Fb is expressed by an equation 1 shown below.

$$Tb = 2 \times 120 \, \mu F \qquad (1)$$
$$= 240 \, \mu F$$
$$= 60 \, F$$

Besides, the frictional force Fp is a frictional force that is generated through the pressing of the brake pads 14A and 14B against the cylindrical faces 36A and 36B of the disc portion 20A respectively with the pressing force (μF) and frictional engagement of the outer peripheral faces with the cylindrical faces thereof. In consequence, the braking torque Tp resulting from the frictional force Fp is expressed by an equation 2 shown below.

$$Tp = 2 \times \mu F \times \mu \times 152.5 \quad (2)$$
$$= 19\ F$$

Accordingly, the braking torque Tp of the brake device 10 is expressed by an equation 3 shown below. A servo ratio Rb of the braking torque in contrast with a brake device that generates only the braking torque Tb resulting from the frictional force Fp is expressed by an equation 4 shown below.

$$Tbp = 60\ F + 19\ F \quad (3)$$
$$= 79\ F$$
$$Rb = 79\ F / 60\ F \quad (4)$$
$$\approx 1.3$$

Incidentally, in the present embodiment of the invention, in the case where N (a positive integer) brake pads and the like are provided respectively, the braking torque Tb is N times as great as the value expressed by the equation 3. Therefore, a still higher braking torque can be generated, and the servo ratio Rb can also be further enhanced.

In particular, according to the first embodiment of the invention, the brake pads 14A and 14B are frictionally engaged, on both the faces of the circular plate portions thereof, with the disc portion 20A and the like. Therefore, the pressing forces of the pressing devices 60A and 60B can be efficiently transmitted such that the pressing forces on both the faces become equal to each other. Besides, the deformation stress applied to the brake pads can be reduced in comparison with a case where frictional engagement with the disc portion 20A and the like is carried out on one face of the circular plate portion of each of the brake pads 14A and 14B and other regions. Incidentally, this operation and this effect are also obtained in other embodiments of the invention that will be described later.

Second Embodiment

Figure 4:
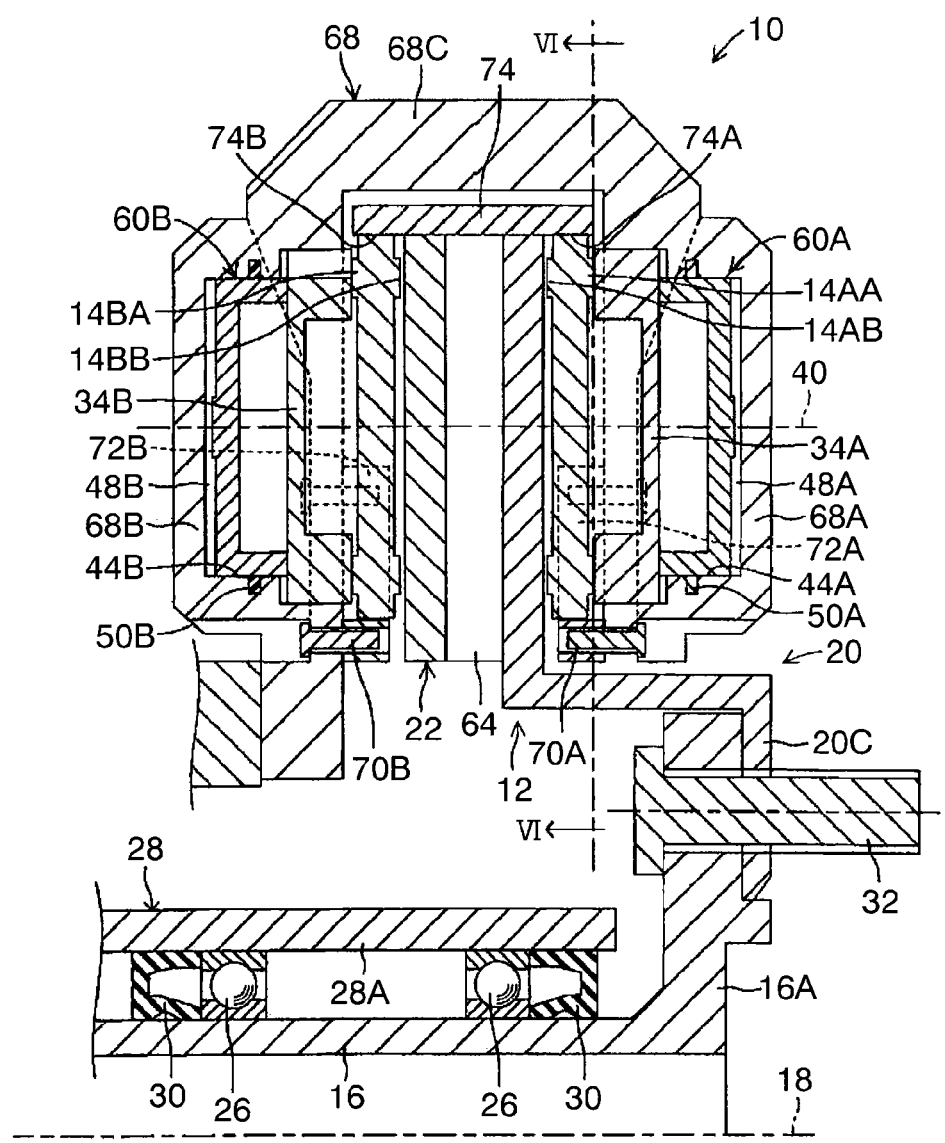
FIG. 4 is a cross-sectional view showing a second embodiment of a friction brake device according to the invention that is configured as a vehicular brake device, as cut along a section passing through an axis of rotation.
Figure 5:
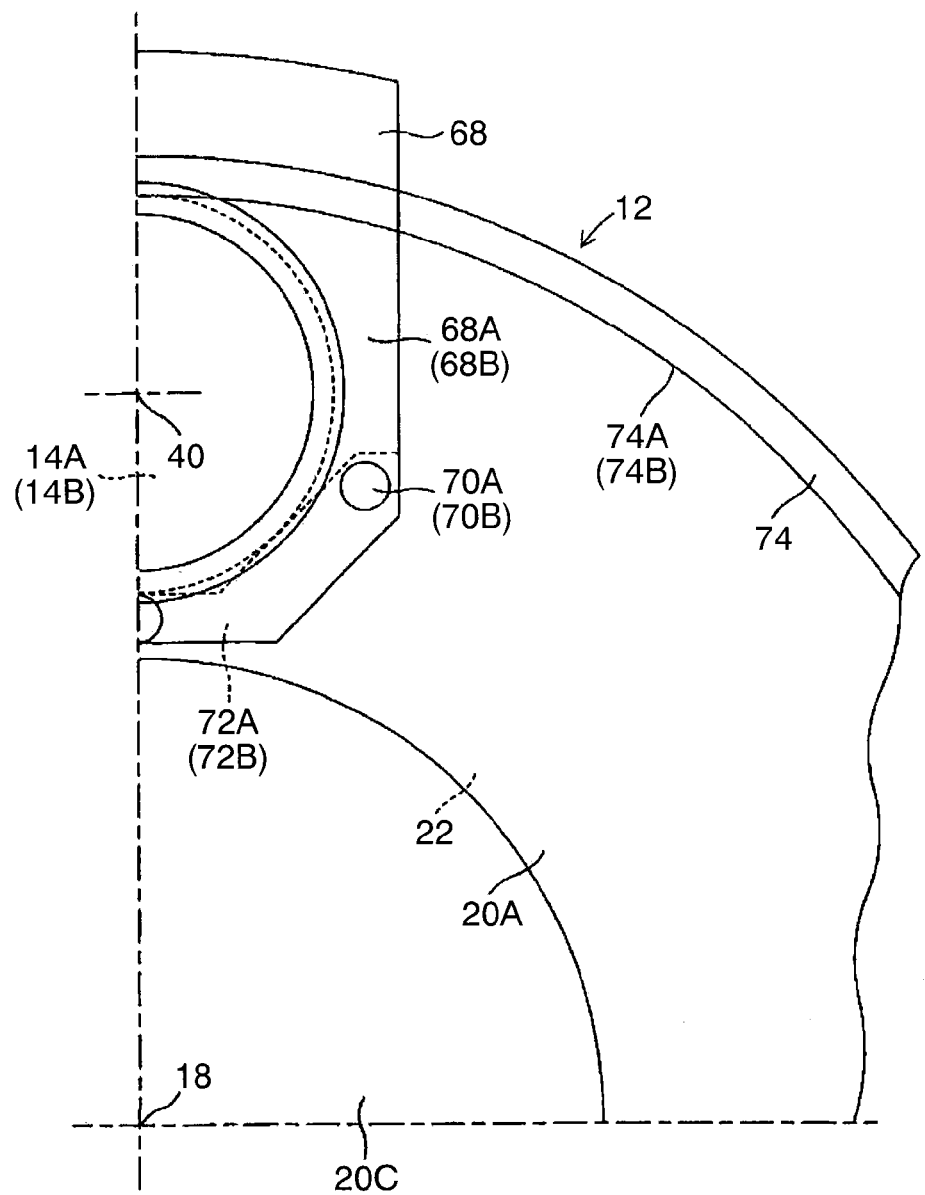
FIG. 5 is a partial lateral view of the second embodiment of the invention, as viewed from the right side of FIG. 4.
Figure 6:
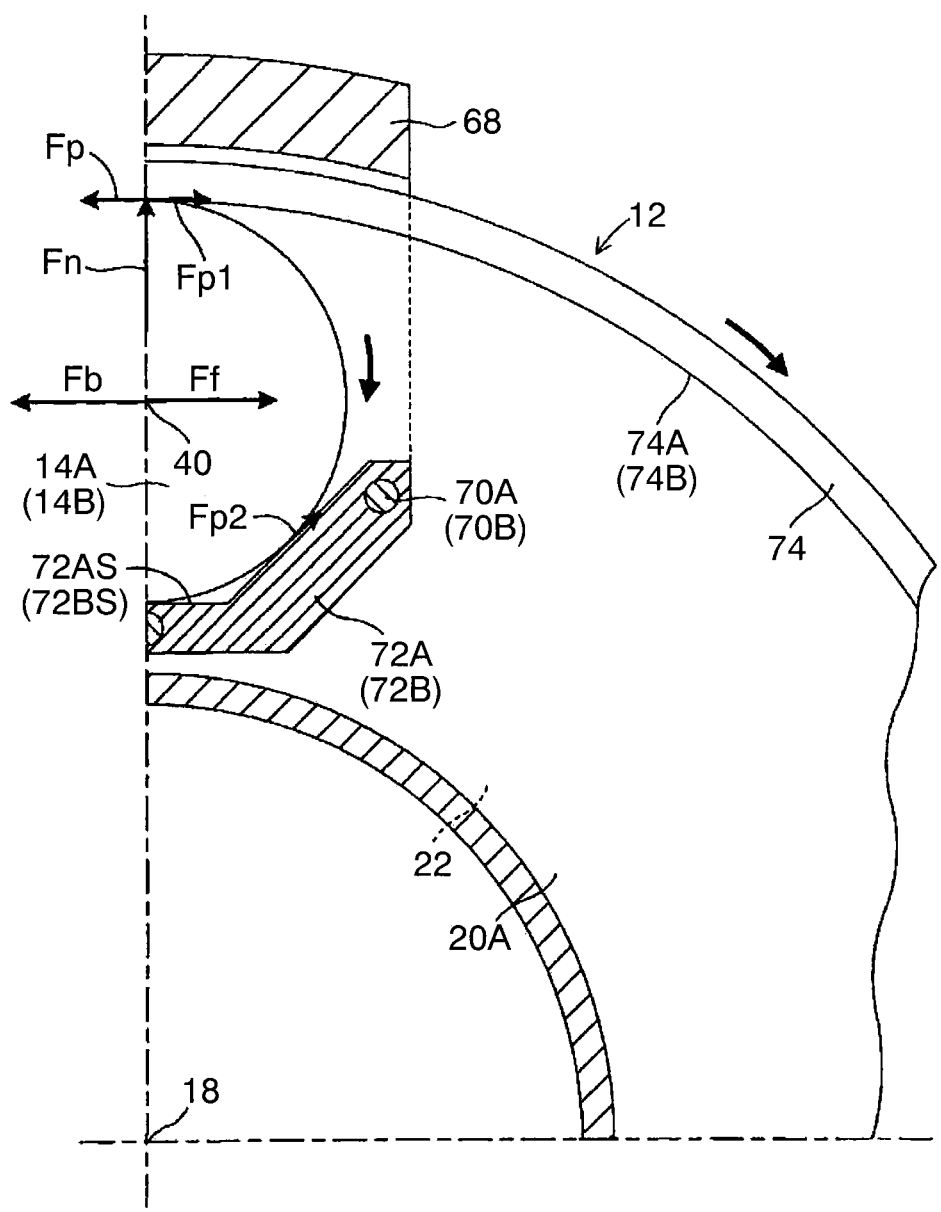
FIG. 6 is a partial cross-sectional view taken along a line VI-VI of FIG. 4.

FIG. 4 is a cross-sectional view showing the second embodiment of a friction brake device according to the invention that is configured as a vehicular brake device, as cut along a section passing through an axis of rotation. FIG. 5 is a partial lateral view of the second embodiment of the invention as viewed from the right side of FIG. 4. FIG. 6 is a partial cross-sectional view taken along a line VI-VI of FIG. 4.

In this second embodiment of the invention, the main rotor 20 does not have the cylinder portion 20B, and is a member separate from the rotary shaft 16. Besides, the annular plate-like disc portion 20A of the main rotor 20 is integrally connected to the subsidiary rotor 22 by a connection portion 64 that consists of fins for radiating heat. The rotary shaft 16 has a flange portion 16A at an outer end thereof. An inner periphery portion of a rim portion 20C that is integrated with the disc portion 20A is coupled to the flange portion 16A by the four bolts 32. Accordingly, although not shown in the drawings, the rim portion 20C is integrally coupled to a rim portion of a wheel together with the flange portion 16A, by co-fastening the bolts 32 and nuts screwed thereto.

The brake pads 14A and 14B, the non-rotary friction members 34A and 34B, and the pistons 42A and 42B are arranged on both sides of the brake rotor 12 respectively, in an orientation reverse to that of the first embodiment of the invention. Besides, the non-rotary friction members 34A and 34B are supported in such a manner as to be displaceable relatively to the brake rotor 12 along the axis of autorotation 40 but not rotatable around the axis of autorotation 40, by a caliper 68 that extends substantially in a U-shaped cross-section across the outer peripheral portion of the brake rotor 12.

The caliper 68 is constituted of a pair of arm portions 68A and 68B that are located on both the sides of the brake rotor 12 respectively, and a connection portion 68C that integrally connects outer ends of those arm portions in the radial direction to each other. The arm portions 68A and 68B are provided with cylinder bores 44A and 44B in such a manner as to extend along the axis of autorotation 40, respectively. The pistons 42A and 42B are fitted to the cylinder bores 44A and 44B in a reciprocable manner along the axis of autorotation 40 respectively, and cooperate with the arm portions 68A and 68B to define cylinder chambers 48A and 48B respectively. Accordingly, the pressing devices 60A and 60B according to this second embodiment of the invention are defined by the pistons 42A and 42B and the cylinder chambers 48A and 48B respectively.

Although not shown in FIG. 4, the cylinder chambers 48A and 48B are connected to a hydraulic brake actuator by inner passages that are provided in the arm portions 68A and 68B and ducts that communicate therewith. Accordingly, the oil pressures in the cylinder chambers 48A and 48B are simultaneously controlled to the same pressure by the brake actuator.

Brake pad support members 72A and 72B are fixed to inner faces of inner end portions of the arm portions 68A and 68B in the radial direction by three bolts 70A and 70B respectively. The brake pad support members 72A and 72B are in the same shape as the shelf portions 38A and 38B according to the first embodiment of the invention, and are spaced apart from each other in the axial direction by the disc portion 20A and the subsidiary rotor 22.

A cylindrical body 74 is fixed to the outer periphery of the main rotor 20 by means such as welding or the like. The cylindrical body 74 has an axial length greater than the thickness of the outer periphery portion of the brake rotor 12, and protrudes on both sides of the brake rotor 12 in the axial direction. Inner peripheral faces 74A and 74B of the cylindrical body 74 cooperate with support faces 72AS and 72BS of the brake pad support members 72A and 72B respectively, and support the brake pads 14A and 14B respectively in such a manner as to be displaceable relatively to the stationary member 38 along the axis of autorotation 40 and rotatable around the axis of autorotation 40.

The relationship between the friction coefficients of the respective frictional engagement portions of the brake pad support members 72A and 72B is also set in the same manner as the relationship between the friction coefficients of the friction engagement portions corresponding to the shelf portions 38A and 38B according to the first embodiment of the invention. Accordingly, the brake pad support members 72A and 72B function in the same manner as the shelf portions 38A and 38B according to the first embodiment of the invention, for the brake pads 14A and 14B respectively.

Accordingly, in this embodiment of the invention as well, an operation and an effect similar to those in the case of the first embodiment of the invention are obtained. That is, the change in the friction coefficient resulting from the progress of abrasion can be reduced in comparison with a case where a friction member is frictionally engaged with a cylindrical portion of a brake rotor through pivoting as is the case with the brake device described in the aforementioned laid-open publication. The brake device 10 can be caused to stably generate a braking force over a long period.

Incidentally, the braking torque Tb of the brake device 10 according to this embodiment of the invention and the servo ratio Rb of the braking torque in contrast with a brake device that generates only the braking torque T resulting from the frictional force F are also the same as in the case of the first embodiment of the invention respectively.

Third Embodiment

Figure 7:
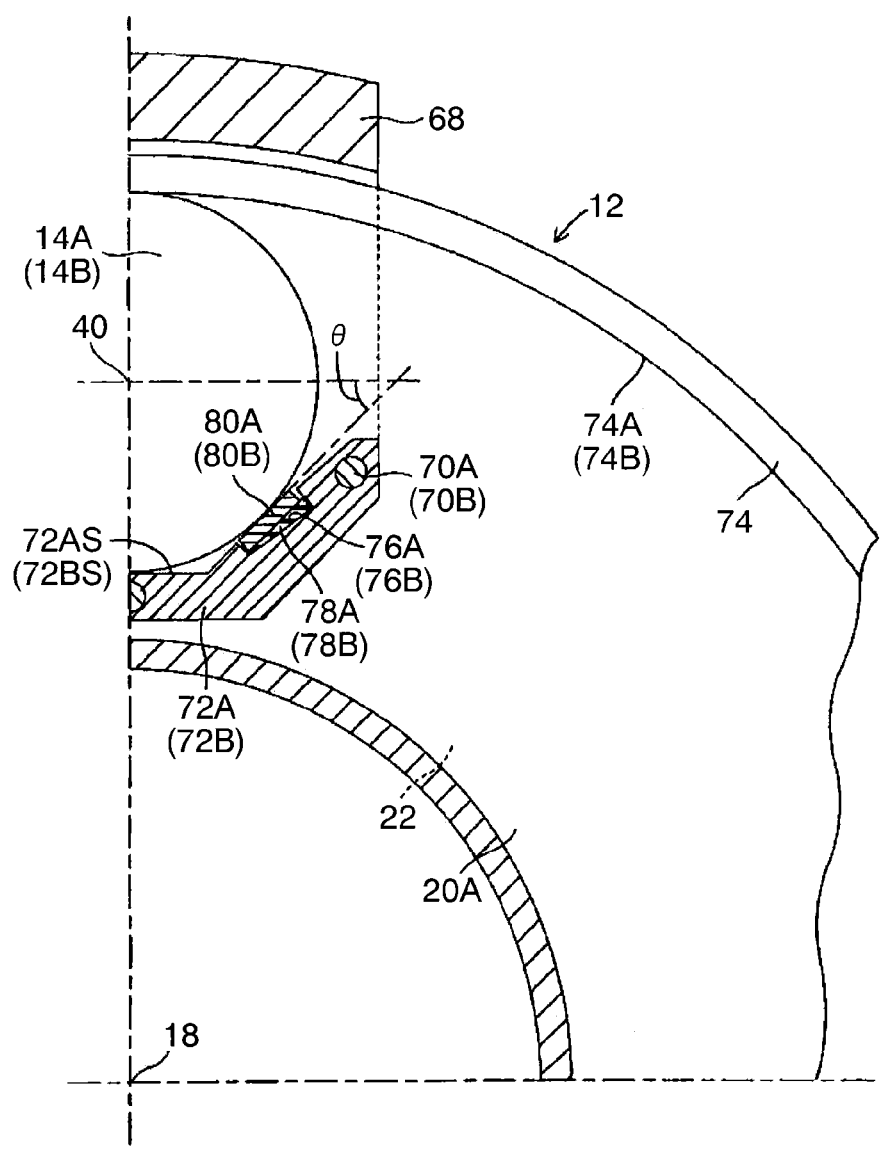
FIG. 7 is a partial cross-sectional view similar to FIG. 6, showing a third embodiment of a brake device according to the invention that is configured as a modification example of the second embodiment of the invention.

FIG. 7 is a partial cross-sectional view similar to FIG. 6, showing the third embodiment of a brake device according to the invention that is configured as a modification example of the second embodiment of the invention.

In this third embodiment of the invention, a groove 76A is provided in a pair of lateral wall faces of the support face 72AS of the brake pad support member 72A. The groove 76A extends perpendicularly to the axis of rotation 18, and the depth of the groove 76A is set in such a manner as to gradually increase as the distance from the axis of rotation 18 increases. An elastic body 78A such as rubber is fixed to a bottom face of the groove 76A, and the thickness of the elastic body 78A is also set in such a manner as to gradually increase as the distance from the axis of rotation 18 increases.

A metal support plate 80A is fixed to a surface of the elastic body 78A by means such as adhesion or the like. When the brake device 10 is out of operation, the surface of the support plate 80A lightly abuts on the outer peripheral face of the brake pad 14A in a state of being inclined with respect to the direction perpendicular to the radial direction by 45°. However, when the brake device 10 is in operation, the support plate 80A is pressed by the brake pad 14A, and the elastic body 78A is compressively deformed in the groove 76A. Thus, an angle of inclination θ of the surface of the support plate 80A with respect to the direction perpendicular to the radial direction is smaller than 45°.

Incidentally, the brake pad support member 72B is also configured in the same manner as the brake pad support member 72A. Accordingly, the brake pad support member 72B operates in the same manner as the brake pad support member 72A regardless of whether the brake device 10 is out of operation or in operation, and a support plate 80B tilts in the same manner as the support plate 80A through compressive deformation of an elastic body 78B.

In other respects, this third embodiment of the invention is configured in the same manner as the aforementioned second embodiment of the invention. In consequence, the third embodiment of the invention is identical in operation to the second embodiment of the invention except in that the reactive force received by the brake pads 14A and 14B from the brake pad support members 72A and 72B during operation of the brake device 10 is closer to the radial direction than in the case of the second embodiment of the invention. In consequence, according to the third embodiment of the invention, an operation and an effect similar to those in the case of the second embodiment of the invention can be obtained.

In particular, according to the third embodiment of the invention, the braking torque Tb of the brake device 10 and the servo ratio Rb of the braking torque can be made greater than the values of the second embodiment of the invention respectively. Besides, the amounts by which the braking torque Tb and the servo ratio Rb of the braking torque are greater than the values of the second embodiment of the invention respectively can be gradually increased as the pressing force of the pressing devices 60A and 60B increases.

That is, it is assumed that the dimensions of the respective members of the brake device 10 are equal to the values of the second embodiment of the invention respectively. The braking torque Tp resulting from the frictional force Fp generated by the outer peripheral faces of the brake pads 14A and 14B is expressed by an equation 5 shown below.

$$Tp = 2 \times \mu F / \tan\theta \times \mu \times 152.5 \quad (5)$$
$$= 19 \ F / \tan\theta$$

When the angle of inclination θ is 45°, the braking torque Tp is 19 F as is the case with the first embodiment of the invention and the second embodiment of the invention. However, when the angle of inclination θ becomes 30°, the braking torque Tp increases to about 33 F. In consequence, if the angle of inclination θ decreases from 45° to 30° as the pressing force increases, the braking torque Tp gradually increases from 19 F to about 33 F.

Besides, when the angle of inclination θ becomes 30°, the servo ratio Rb of the braking torque is expressed by an equation 6 shown below. In consequence, if the angle of inclination θ decreases from 45° to 30° as the pressing force increases, the servo ratio Rb gradually increases from 1.3, which is expressed by the aforementioned equation 4, to 1.6.

$$Rb = (60 \ F + 33 \ F) / 60 \ F \quad (6)$$
$$= 93 \ F / 60 \ F$$
$$\approx 1.6$$

Incidentally, when the operations of the brake pad support members 72A and 72B according to this third embodiment of the invention are strictly observed, the reactive force resulting from elastic deformation of the elastic bodies 78A and 78B increases the force with which the brake pads 14A and 14B are pressed against the cylindrical faces 36A and 36B respectively. In consequence, the amounts and rates of increase in the braking torque Tp and the servo ratio Rb of the braking torque resulting from an increase in the pressing force are greater than the aforementioned values respectively.

Fourth Embodiment

Figure 8:
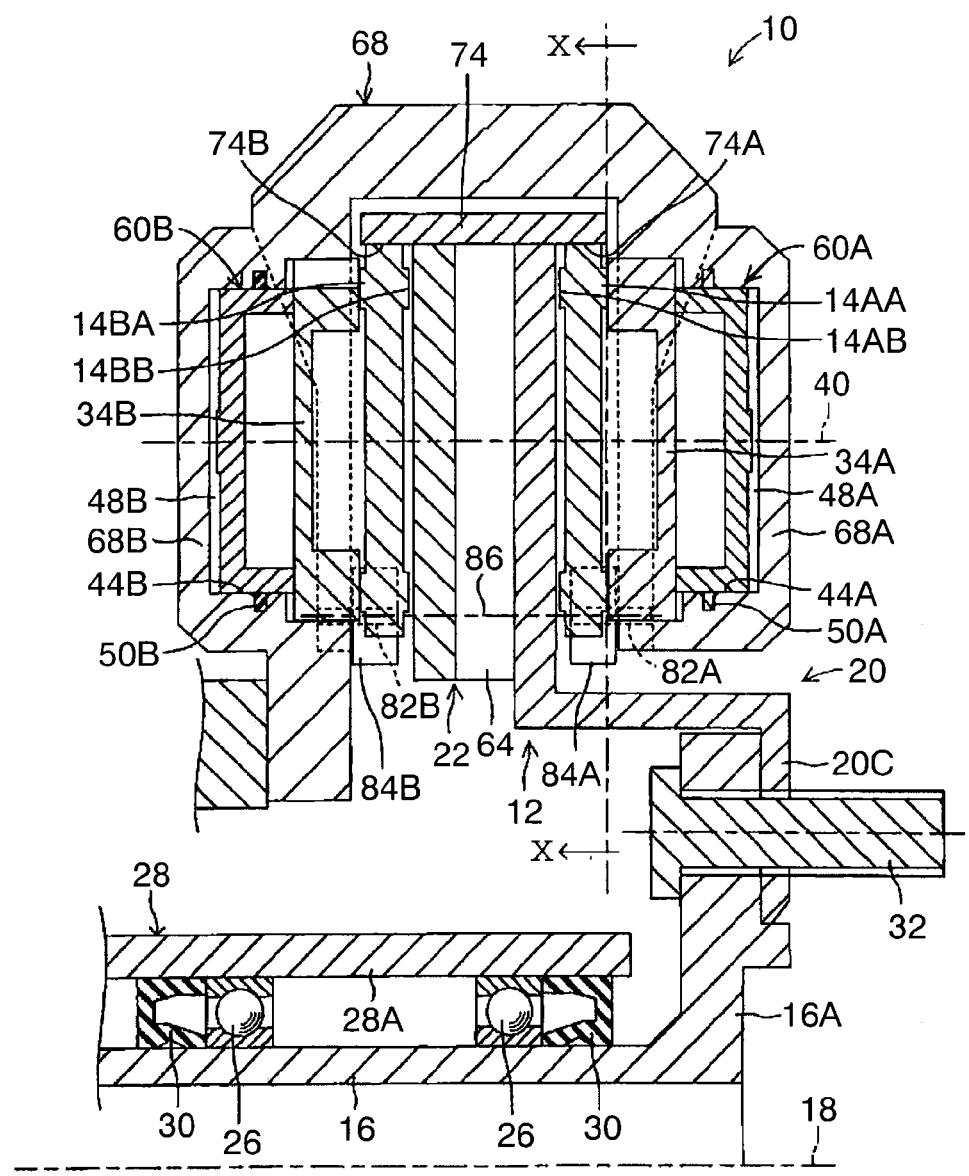
FIG. 8 is a cross-sectional view showing a fourth embodiment of a friction brake device according to the invention that is configured as a modification example of the second embodiment of the invention, as cut along a section passing through an axis of rotation.
Figure 9:
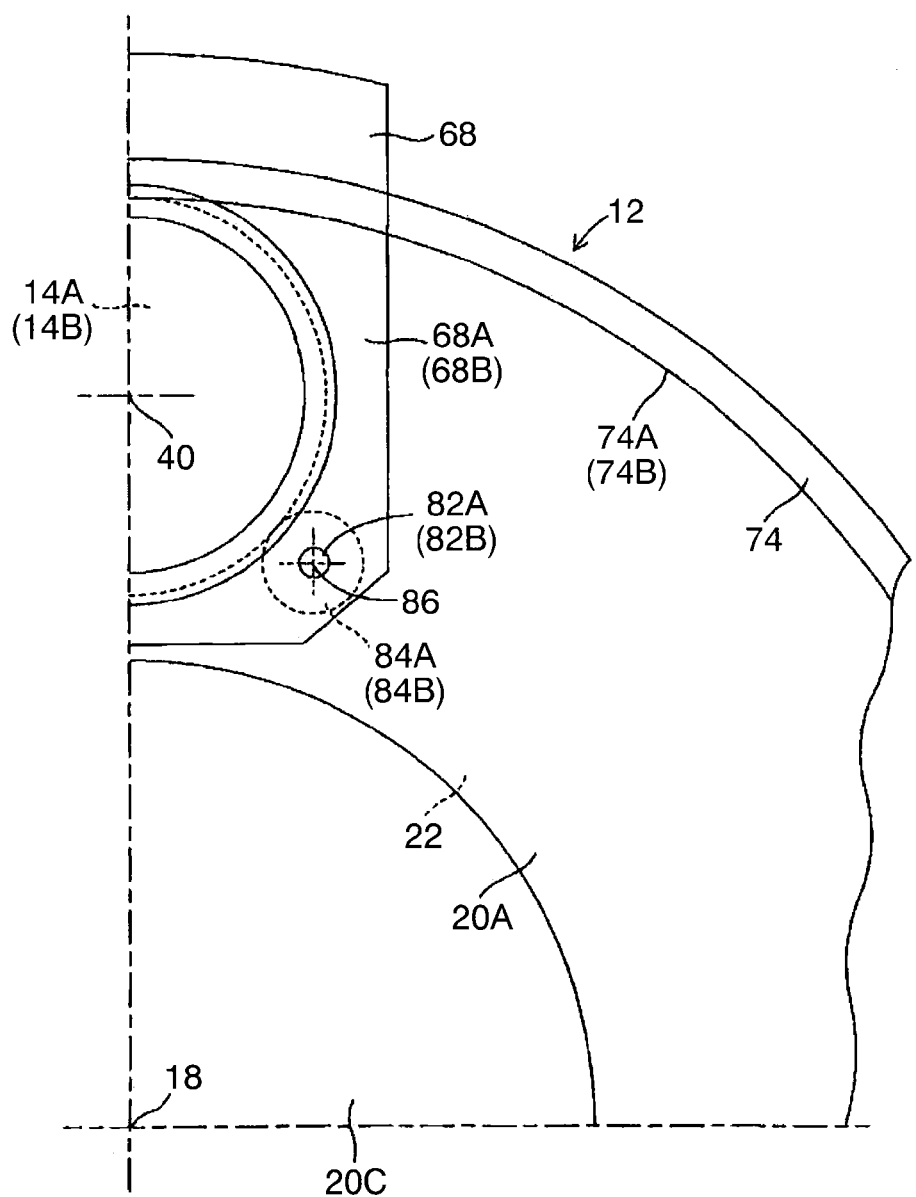
FIG. 9 is a partial lateral view of the fourth embodiment of the invention as viewed from the right side of FIG. 8.
Figure 10:
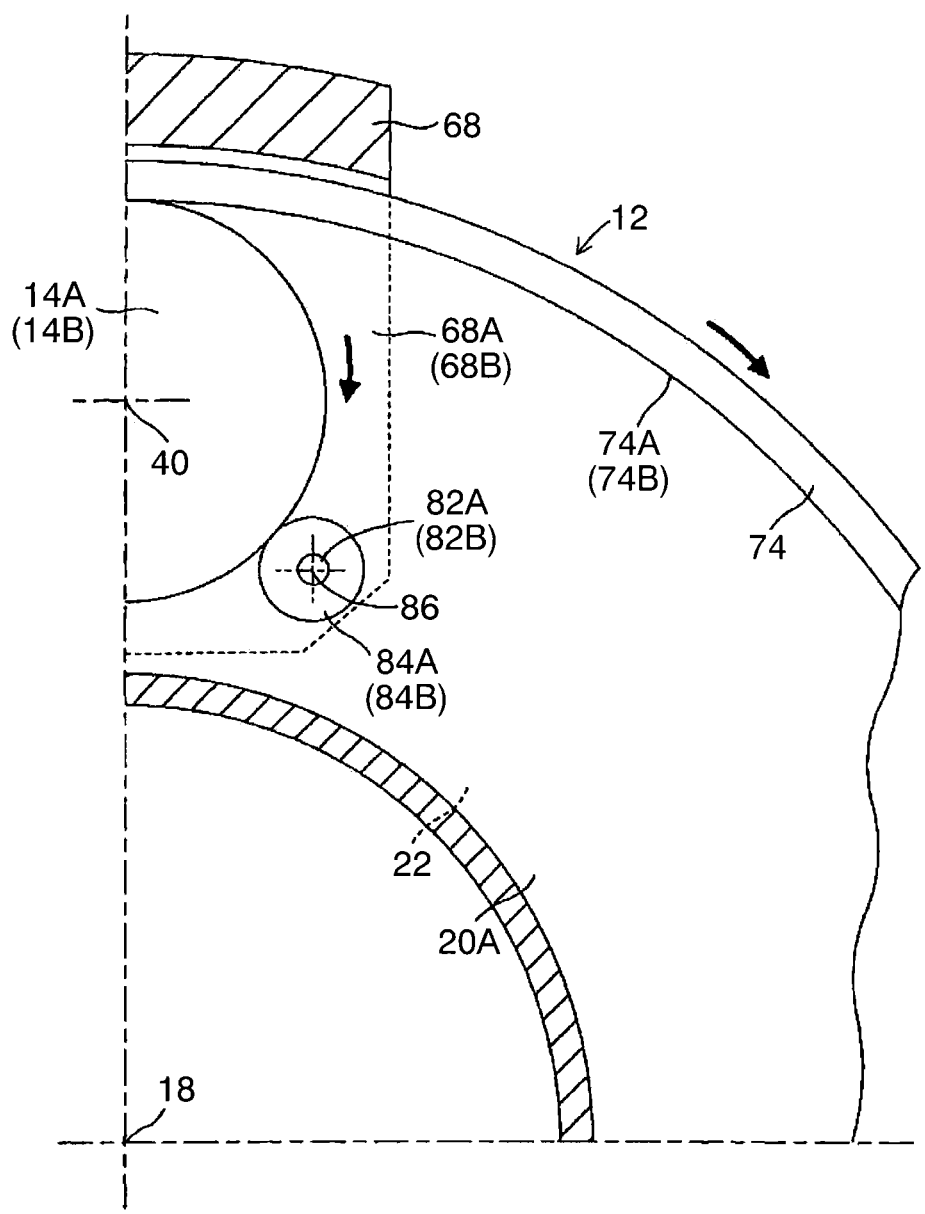
FIG. 10 is a partial cross-sectional view taken along a line X-X of FIG. 8.

FIG. 8 is a cross-sectional view showing the fourth embodiment of a friction brake device according to the invention that is configured as a modification example of the second embodiment of the invention, as cut along a section passing through an axis of rotation. FIG. 9 is a partial lateral view according to the fourth embodiment of the invention, as viewed from the right side of FIG. 8. FIG. 10 is a partial cross-sectional view taken along a line X-X of FIG. 8.

In this fourth embodiment of the invention, the brake pad support members 72A and 72B are not fixed to the inner faces of the inner end portions of the arm portions 68A and 68B respectively. However, rollers 84A and 84B that function as brake pad support members are rollably supported around a rolling axis 86 parallel to the axis of rotation 18, by pins 82A and 82B that are fixed to the inner end portions of the arm portions 68A and 68B in the radial direction respectively through, for example, press-fitting. The rollers 84A and 84B are formed of a substantially rigid material such as a metal with a small friction coefficient.

The rollers 84A and 84B cooperate with the cylindrical body 74 fixed to the outer periphery of the main rotor 20, and support the brake pads 14A and 14B respectively in such a manner as to be displaceable relatively to the stationary member 38 along the axis of autorotation 40 and rotatable around the axis of autorotation 40. In particular, the rollers 84A and 84B are in contact with the outer peripheral faces of the brake pads 14A and 14B respectively, at a position where the angle of inclination with respect to the direction perpendicular to the radial direction is 45°.

In consequence, the rollers 84A and 84B function in the same manner as the shelf portions 38A and 38B according to the first embodiment of the invention and the brake pad support members 72A and 72B according to the second embodiment of the invention, respectively. Accordingly, in this embodiment of the invention as well, an operation and an effect similar to those in the case of the first embodiment of the invention can be obtained. The braking torque Tb of the brake device 10 and the servo ratio Rb of the braking torque can be set to greater values as is the case with the first embodiment of the invention and the second embodiment of the invention, than in a brake device that generates only the braking torque T resulting from the frictional force F.

In particular, the rollers 84A and 84B are rollably supported by the pins 82A and 82B respectively. In consequence, when the brake pads 14A and 14B are moved in the circumferential direction by the disc portion 20A and the subsidiary rotor 22 respectively, the frictional force generated between the outer peripheral faces of the brake pads and the brake pad support members can be made smaller than in the cases of the other embodiments of the invention.

Incidentally, the rollers 84A and 84B are formed of a rigid material, but may be formed of a compressively deformable material such as rubber or resin. In that case, as the pressing force of the pressing devices 60A and 60B increases, the amount of compressive deformation of the rollers 84A and 84B increases, and the angle of inclination formed by the surfaces of the rollers, which are in contact with the outer peripheral faces of the brake pads 14A and 14B respectively, with respect to the direction perpendicular to the radial direction decreases.

Accordingly, as is the case with the aforementioned third embodiment of the invention, the braking torque Tbp of the brake device 10 and the servo ratio Rb of the braking torque can be made greater than the values of the second embodiment of the invention respectively. Besides, the amounts by which the braking torque Tbp and the servo ratio Rb of the braking torque are greater than the values of the second embodiment of the invention respectively can be gradually increased as the pressing force of the pressing devices 60A and 60B increases.

The invention has been described above in detail as to the specific embodiments thereof. However, the invention is not limited to the aforementioned embodiments thereof. It would be obvious to those skilled in the art that other various embodiments are possible within the scope of the invention.

For example, in each of the aforementioned embodiments of the invention, the pair of the brake pads, the pair of the non-rotary friction members, the pair of the pistons, and the pair of the pressing devices are provided. However, it is also acceptable to provide only one brake pad, only one non-rotary friction member, only one piston, and only one pressing device.

Besides, in each of the aforementioned respective embodiments of the invention, when the shelf portion 38A, the brake pad support member 72A and the like as the support members begin to be engaged with at least the brake pads 14A and 14B, the angle of inclination formed by the surfaces thereof with respect to the direction perpendicular to the radial direction is 45°. However, this angle of inclination may be different from 45°.

Besides, in each of the aforementioned respective embodiments of the invention, the support members such as the shelf portion 38A, the brake pad support member 72A and the like are formed of a rigid material, but may be formed of an elastically deformable material as is the case with the modification examples of the rollers 84A and 84B according to the fourth embodiment of the invention. In that case, even if there is no configuration as in the third embodiment of the invention, an operation and an effect similar to those peculiar to the third embodiment of the invention can be obtained.

Besides, in the aforementioned first embodiment of the invention, the main rotor 20 and the subsidiary rotor 22 do not cooperate with the rotary shaft 16, the wheel support member 28 and the stationary member 38 to form a sealed space, but may be modified such that a sealed space is formed. Besides, in that case, the sealed space may be filled with a lubricant.

Besides, in the aforementioned first embodiment of the invention, the cylinder portion 20B is formed integrally with the disc portion 20A to form the main rotor 20. However, the cylinder portion 20B may be formed integrally with the subsidiary rotor 22. Besides, the disc portion 20A, the cylinder portion 20B, and the subsidiary rotor 22 may be formed separately from one another.

Besides, in the aforementioned third embodiment of the invention, the elastic bodies 78A and 78B are compressively deformed, and the angle of inclination of the surfaces of the support plates 80A and 80B changes. However, it is also acceptable to make a modification such that the angle of inclination of the surfaces of the support plates 80A and 80B does not change, that the elastic bodies 78A and 78B are compressively deformed, and that the reactive force thereof increases.

Besides, in each of the aforementioned embodiments of the invention, each of the pressing devices is a hydraulic pressing device in which a piston is fitted in a cylinder bore to form a cylinder chamber, but may be modified into an electromagnetic actuator. Besides, the brake device according to each of the embodiments of the invention is a vehicular brake device. However, the brake device according to the invention may be applied to purposes other than the use in vehicles.

The invention claimed is:

1. A friction brake device comprising:
    a brake rotor that rotates around an axis of rotation;
    a rotary friction member that is rotatable around an axis of autorotation parallel to the axis of rotation;
    a support member that supports the rotary friction member rotatably around the axis of autorotation; and
    a pressing device that presses the rotary friction member against the brake rotor, wherein the rotary friction member revolves around the axis of rotation relatively to the brake rotor while being frictionally engaged with a lateral face of the brake rotor, when the pressing device presses the rotary friction member against the brake rotor, the support member is configured to press the rotary friction member in a direction perpendicular to the axis of rotation, and frictionally engage an outer periphery of a circular plate portion of the rotary friction member with a cylindrical face of the brake rotor, when the rotary friction member revolves, and the rotary friction member is caused to auto-rotate around the axis of autorotation by a first frictional force between the rotary friction member and the lateral face of the brake rotor when the pressing device begins to press the rotary friction member, but the rotary friction member comes to rest when a first pressing force by the pressing device increases.

2. The friction brake device according to claim 1, wherein the support member supports the rotary friction member rotatably around the axis of autorotation, on a support face including an inclined face that is inclined with respect to a direction perpendicular to a radial direction of the brake rotor, and the support member presses the rotary friction member by a reactive force of a second pressing force applied to the inclined face by the rotary friction member.

3. The friction brake device according to claim 1, wherein a second frictional force between the rotary friction member and the support member is smaller than a third frictional force between the outer periphery of the rotary friction member and the cylindrical face of the brake rotor.

4. The friction brake device according to claim 1, wherein the support member comprises a support face which is a cylindrical surface of a rolling member that rolls around a rolling axis parallel to the axis of autorotation.

5. The friction brake device according to claim 1, wherein the support member includes an elastic member that is elastically deformed by the rotary friction member to increase a reactive force applied to the rotary friction member when the rotary friction member revolves.

6. The friction brake device according to claim 2, wherein the support member is configured such that an angle of inclination of the inclined face with respect to the direction perpendicular to the radial direction of the brake rotor decreases as the second pressing force applied to the inclined face by the rotary friction member increases.

7. The friction brake device according to claim 1, wherein the pressing device presses the rotary friction member against the brake rotor via a non-rotary friction member that is non-rotatably supported around the axis of rotation, and the rotary friction member is frictionally engaged, on one side thereof, with the brake rotor, and is frictionally engaged, on the other side thereof, with the non-rotary friction member.

* * * * *